(12) United States Patent
Osborne

(10) Patent No.: US 10,974,472 B2
(45) Date of Patent: Apr. 13, 2021

(54) COMPOSITE PART MANUFACTURING USING MAGNETICALLY-INDEXED TOOLING PINS

(71) Applicant: THE BOEING COMPANY, Chicago, IL (US)

(72) Inventor: Max Marley Osborne, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 260 days.

(21) Appl. No.: 16/164,484

(22) Filed: Oct. 18, 2018

(65) Prior Publication Data

US 2020/0122415 A1 Apr. 23, 2020

(51) Int. Cl.
| | | |
|---|---|---|
| B29C 70/54 | (2006.01) | |
| B29C 70/38 | (2006.01) | |
| B29C 70/34 | (2006.01) | |
| B29C 65/78 | (2006.01) | |

(52) U.S. Cl.
CPC .......... B29C 70/541 (2013.01); B29C 65/785 (2013.01); B29C 70/342 (2013.01); B29C 70/386 (2013.01); B29C 70/545 (2013.01)

(58) Field of Classification Search
CPC .......................... B29C 70/541; B29C 65/785
See application file for complete search history.

(56) References Cited

U.S. PATENT DOCUMENTS

| | | | | |
|---|---|---|---|---|
| 4,016,022 A | * | 4/1977 | Browning | B29C 70/12 156/285 |
| 4,836,765 A | * | 6/1989 | Kornitzky | B29C 33/202 156/285 |
| 5,817,265 A | * | 10/1998 | Gendreau | B29B 11/06 264/138 |
| 5,993,184 A | * | 11/1999 | Morrow | B29C 33/32 156/382 |
| 9,403,328 B1 | * | 8/2016 | Hafenrichter | B29C 73/30 |
| 2002/0022422 A1 | * | 2/2002 | Waldrop, III | B29D 99/0014 442/179 |
| 2011/0180209 A1 | * | 7/2011 | Grabau | B29D 99/0025 156/285 |
| 2012/0258276 A1 | * | 10/2012 | Modin | B29C 70/443 428/98 |

OTHER PUBLICATIONS

Gardiner, Ginger, "Double-bag infusion: 70% fiber volume?", <Double-bag infusion: 70% fiber volume? : CompositesWorld> retrieved Oct. 18, 2018, 6 pgs.
Hou, T. H., et al., "Evaluation of Double-Vacuum-Bag Process for Composite Fabrication," NASA Langley Research Center, Hampton, VA, <https://ntrs.nasa.gov/search.jsp?R=20040073434 2018-10-18T18:07:14+00:00Z> retrieved Oct. 18, 2018, 13 pgs.

* cited by examiner

*Primary Examiner* — Scott W Dodds
(74) *Attorney, Agent, or Firm* — Moore IP Law

(57) ABSTRACT

A method of composite part manufacturing includes inserting a tooling pin of a magnet into a ply charge. The method also includes coupling the ply charge to a tool using the magnet and a second magnet of the tool. The magnet positions the ply charge on the tool. The tooling pin provides a retaining force to resist movement of the ply charge. The method further includes applying resin to the ply charge and curing the resin to form a cured composite material.

20 Claims, 9 Drawing Sheets

COMPOSITE PART MANUFACTURING USING MAGNETICALLY-INDEXED TOOLING PINS

FIELD OF THE DISCLOSURE

The present disclosure is generally related to composite part fabrication using magnets and tooling pins.

BACKGROUND

In some composite part manufacturing processes, a tooling pin is used to position or retain materials on a tool. During formation of a composite part, composite materials and a vacuum bag or vacuum bags are deformed on the tool using a pressure differential (commonly referred to as vacuum). If tooling pins are used, deformation of the composite materials and the vacuum bag(s) can cause the tooling pins to puncture the vacuum bag(s). Thus, for some manufacturing processes, such as double bag vacuum processes, the composite materials are laid-up on a layup surface of a tool by hand and are manually affixed to the layup surface with adhesives (rather than tooling pins). Such manual layup processes are time consuming.

SUMMARY

In a particular implementation, a system includes a tool including a layup surface and a first plurality of magnets. The system also includes a ply charge including a second plurality of magnets. The second plurality of magnets are configured to magnetically couple with the first plurality of magnets of the tool to position the ply charge relative to the layup surface. The system includes a first vacuum bag coupled to the tool and positioned between the tool and the ply charge and includes a second vacuum bag coupled to the tool and positioned on the ply charge and the first vacuum bag. The system also includes a curing device configured to provide energy to cure a resin applied to the ply charge. The system includes one or more vacuum devices configured to evacuate cavities formed by the first vacuum bag and the second vacuum bag.

In another particular implementation, a tool includes a plurality of surfaces defining one or more cavities. The plurality of surfaces have a first attachment area for a first vacuum bag and a second attachment area for a second vacuum bag. The plurality of surfaces further include a layup surface configured to support a ply charge. The tool further includes a plurality of magnets coupled to the layup surface, the plurality of magnets configured to magnetically couple with tooling pins of the ply charge to position the ply charge relative the layup surface.

In a particular implementation, a method of composite part manufacturing includes inserting a tooling pin of a magnet into a ply charge. The method also includes coupling the ply charge to a tool using the magnet and a second magnet of the tool. The magnet positions the ply charge on the tool. The tooling pin provides a retaining force to resist movement of the ply charge. The method further includes applying resin to the ply charge and curing the resin to form a cured composite material.

By utilizing magnetically-indexed tooling pins, composite parts can be formed more quickly and easily and with reduced costs. Additionally, magnetically-indexed tooling pins can be used in double bag vacuum processes to enable an easier and quicker layup of the ply charge. Furthermore, by utilizing magnetically-indexed tooling pins, composite parts can be formed more accurately.

DETAILED DESCRIPTION

Figure 1:
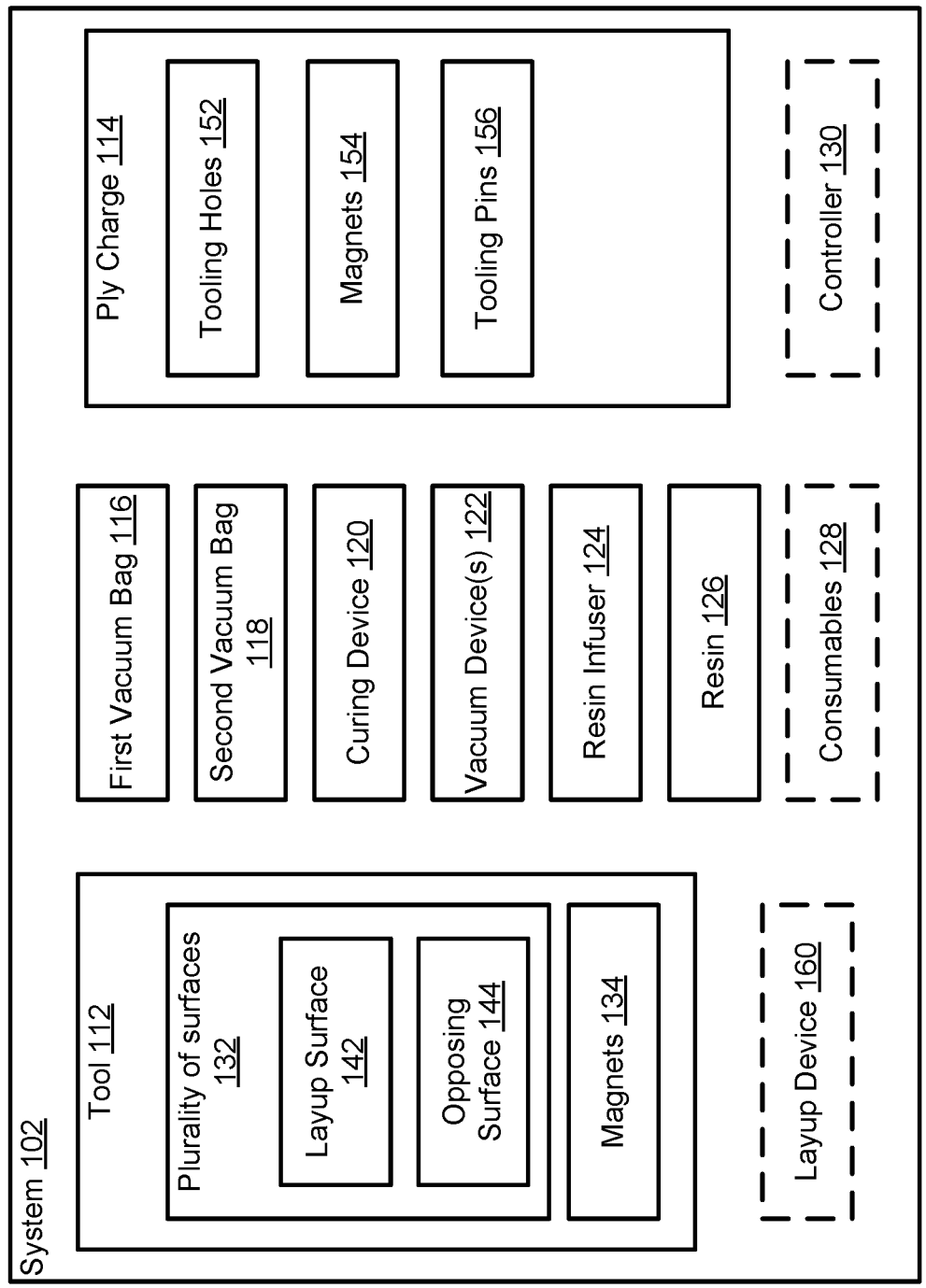
FIG. 1 is a block diagram that illustrates an example of a composite part manufacturing system.

Implementations disclosed herein enable formation of a composite part using magnetically-indexed tooling pins. For example, a tooling pin can include or be coupled to a magnet, or a magnet can be shaped to include a tooling pin feature, to form a magnetic tooling pin. The magnetic tooling pin can be used to assist in positioning composite materials in a layup position on a tool used to support formation of a composite part. The tool can include a magnetic alignment feature, such as a magnet, that interacts with the magnetic tooling pin to align the composite materials, to retain the composite materials in the layup position, or both. The magnetic interaction of the magnetic tooling pin with the magnetic alignment feature can occur through a vacuum bag, allowing the magnetic tooling pin to be used without the tooling pin feature penetrating a vacuum bag.

Further, in some implementations, using magnetically-indexed tooling pins allows the layup of composite materials to be pre-formed, e.g., laid up at any convenient location rather than on the tool surface. For example, in a double bag vacuum process, a layup stack including one or more magnetic tooling pins and some combination of a first vacuum bag, composite materials (e.g., a ply charge, resin, or both), consumables (e.g., a release film, a breather fabric, resin distribution components, etc.), and a second vacuum bag can be formed on a worksurface distinct from a tool used to shape the composite part (e.g., a tool with a layup surface having a shape based on a designed shape of a composite part). The layup stack can subsequently be moved to the tool, and magnetic alignment feature(s) of the tool and the magnetic tooling pin(s) of the layup stack interact to index the layup stack relative to the tool. The layup process can be labor and time intensive and can use specialized tools. Separating the layup process from the tool enables more efficient use of the tool since layup of a first layup stack can be performed on the worksurface while the tool is being used to form and cure another layup stack to form a composite part. Additionally, separating the layup process from the tool can enable use of more automated process for forming the layup stack since the worksurface can be flat and automated tools to layup composite materials on a flat surface can be faster and are generally less complicated and less expensive than automated tools to layup composite materials on tool surfaces with arbitrary shapes.

The magnet(s) of the tool can be positioned in a recess of the tool or embedded within a surface of the tool and are used to couple with magnet(s) of a ply charge that has a tooling pin. The tooling pin is inserted into a tooling hole of the layup stack. The tooling hole is an opening formed, for example, by a cross-cut in the in plies or fibers of the ply charge. In some implementations, the tooling hole can also extend through or into one or more of the consumables, such as into or through a release film or a breather fabric. The magnet in the layup stack will magnetically locate and self-align (or self-center) with the magnet of the tool, thereby locating and indexing the ply charge in a layup position on the tool. To illustrate, positioning the magnet of the ply charge causes the tooling pin attached to magnet and inserted into the tooling hole of the ply charge to move and position the ply charge.

Using the magnetically-indexed tooling pins, a layup stack or ply charge can be magnetically indexed to curved layup surfaces, vertical layup surfaces, horizontal layup surfaces, flat layup surfaces, or combinations thereof. For example, the magnetically-indexed tooling pins can hold a ply charge in position on a vertical layup surface and resist gravitational forces without additional mechanical fixtures, attachments, adhesive tapes, etc. The magnets and tooling pins enable faster layup of ply charges and faster location of the ply charges relative to layup surface of the tool. In addition, the magnetically-indexed tooling pins enable the use of tooling pin in a double vacuum bag processes where a conventional fixed tooling pin on the layup surface of the tool would penetrate and burst a lower vacuum bag.

Some double vacuum bag processes utilize laser lines projected on the tool surface to guide layup of individual plies of a ply charge. In contrast, the magnets and the magnetically-indexed tooling pins disclosed herein can locate a large and complex stack of plies quickly and easily without having to layup individual plies of a ply charge to a laser line projected on the tool. The magnet and the tooling pins enable a stack of plies (e.g., a ply charge) to be laid up flat, which is simpler and faster, and then transferred to a more complex shaped tool, such as a highly curved tool or a tool having a vertical layup surface. The magnets and the tooling pins locate and also hold the ply stack on vertical surfaces without additional clamping or restraints.

FIG. 1 illustrates block diagram 100 of an example of a composite part manufacturing system 102 that includes a tool 112, a ply charge 114, a curing device 120, one or more vacuum devices 122, and a resin infuser 124. The composite part manufacturing system 102 enables formation of composite parts, such as a composite part 602 of FIG. 6. The composite part manufacturing system 102 may include or correspond to a hand layup manufacturing system, an automated layup manufacturing system, a draping system, a hot draping system, an automated fiber placement system, an automated tape laying system, a composite part trimming system, or a combination thereof. In a particular implementation, the composite part manufacturing system 102 includes or corresponds to a double vacuum bag manufacturing system.

Figure 2:
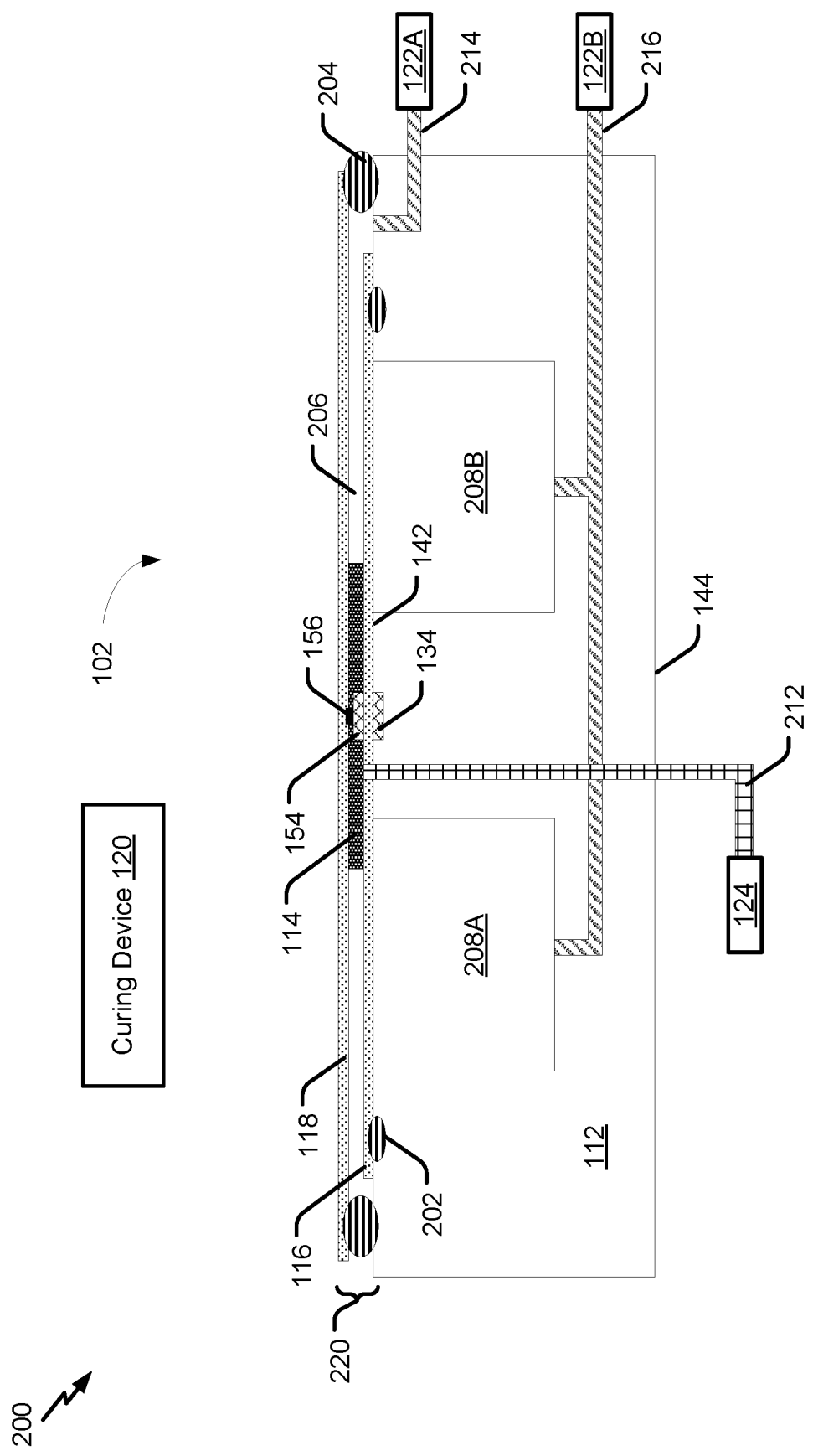
FIG. 2 is a diagram that illustrates a cross-section view of an example of the composite part manufacturing system of FIG. 1 prior to curing.

The tool 112 includes a plurality of surfaces 132. As illustrated in the implementation illustrated in FIG. 1, the plurality of surfaces 132 include a layup surface 142 and an opposing surface 144. The layup surface 142 corresponds to or is defined by one or more surfaces of the tool 112. The layup surface 142 is configured to support formation of the composite part 602. For example, the layup surface 142 acts as a form, mold, or mandrel for the composite part manufacturing system 102 and the ply charge 114. To illustrate, a shape of the layup surface 142 of the tool 112 is similar to or complementary to a shape of the composite part 602. The ply charge 114 (or composite material) conforms to the shape of the layup surface 142 of the tool 112 under heat and/or pressure to form the composite part 602. The opposing surface 144 is opposite of or faces the layup surface 142 and corresponds to a back surface or bottom surface of the tool 112, as illustrated in FIG. 2.

As used herein, a "ply charge" refers to fibers, cloth, mats, or other reinforcement materials of a composite part. In some implementations, a resin 126 is applied to the ply charge 114 before the ply charge 114 is used in the layup stack. A ply charge 114 with resin 126 pre-applied is referred to as a "pre-preg" material. In some implementations, the resin 126 is applied to the ply charge 114 (or to the pre-preg material) in the layup stack or during formation of the layup stack. In each of these situations, the layup stack includes at least the ply charge 114 and the resin 126; however, the timing of application of the resin 126 can vary depending on the process and materials used. For ease of description, the layup stack is referred to herein as including the ply charge 114; however, this should not be understood to mean that the layup stack does not include the resin unless clear from the context. For example, in a layup stack that includes the ply charge 114, the ply charge 114 can include pre-preg material, in which case the resin 126 is also present.

In FIG. 1, the tool 112 includes magnetic alignment features, such as a plurality of magnets 134 (e.g., also referred to herein as magnets 134 or first magnets 134). The plurality of magnets 134 are coupled to the tool 112, such as coupled to the layup surface 142, the opposing surface 144, or embedded within the tool 112. In a particular implementation, the tool 112 does not have tooling pins and thus, during composite part formation (e.g., deformation), vacuum bags 116, 118 are not pierced by tooling pins of the tool 112.

In some implementations, the composite part manufacturing system 102 includes a layup device 160. However, in other implementations, the composite part manufacturing system 102 does not include the layup device 160, and the layup of the ply charge 114 or the composite material is done manually. If present, the layup device 160 can be configured to position or deposit the ply charge 114 on or relative to the layup surface 142 of the tool 112. For example, the layup device 160 can include or correspond to an automated layup machine, an automated tape laying machine, or an automated fiber placement machine. The ply charge 114 can be in the form of tows, tape, plies, sheets, preforms, etc. Alternatively, the layup device 160 can be configured to position or deposit the ply charge 114 on or relative to a worksurface distinct from the layup surface 142 of the tool 112, and the layup stack including the ply charge 114 can subsequently be moved to the tool 112.

As explained above, the ply charge 114 is a dry, resinless fiber material that when combined (e.g., infused) with the resin 126 forms or corresponds to a composite material. As an illustrative, non-limiting example, the ply charge 114 includes or corresponds to multiple layers of dry carbon fiber, as described further with reference to FIG. 4. A composite material is two or more constituent materials combined to create a material with material properties different than the individual material characteristic, such as fiber and resin, etc. In some examples, the tool 112 described herein can be used to make parts from a composite material that is a combination of a fabric(s) or fiber(s) (e.g., fiberglass, carbon, metallic carbon fiber, KEVLAR®, aramid, aluminized fiberglass, etc.) and the resin 126 (e.g., epoxy, bis-Maleimide (BMI), vinyl ester, polyester, etc.).

The ply charge 114 includes tooling holes 152 which are aligned with tooling pins 156 coupled to or including magnets 154 in the layup stack. The tooling holes 152 include or correspond to apertures in the ply charge 114 (e.g., the carbon fiber layers thereof). As illustrative, non-limiting examples, the tooling holes 152 include cross-cuts in the ply charge 114, stitching holes in the ply charge 114, or bore holes in the ply charge 114.

The magnets 154 (also referred to herein as a plurality of magnets 154 or second magnets 154) are configured to magnetically couple with the plurality of magnets 134 of the tool 112. Additionally, the plurality of magnets 154 are configured to position the ply charge 114 on the layup surface 142 based on attraction between the magnets 134, 154.

In some implementations, the magnets 134, 154 include neodymium magnets. In other implementations, the magnets 134, 154 include ceramic magnets, ferrite magnets, samarium cobalt magnets, aluminum nickel cobalt magnets, or a combination thereof. Additionally, the plurality of magnets 134 can include a material that is different from a material of the plurality of magnets 154. In an example, the plurality of magnets 134 include a first material that has a higher temperature threshold (e.g., experiences heat induced magnetic flux degradation at higher temperatures or to a lesser extent) than a second material the plurality of magnets 154, because, in some implementations, such as when the plurality of magnets 134 are embedded in the tool 112, the plurality of magnets 134 can be exposed to more heat cycles as the tool 112 is used to generate multiple composite parts. In some implementations, the plurality of magnets 134 can include electromagnets.

In some implementations, the magnets 134, 154 include cylindrical magnets. Cylindrical magnets produce a relatively high and even centering force as compared to other shapes. In other implementations, the magnets 134, 154 have other shapes and correspond to square magnets, rectangular magnets, triangular magnets, elliptical magnets, etc.

The tooling pins 156 are part of, or coupled to, the plurality of magnets 154. In some examples, the tooling pins 156 correspond to a crown of the plurality of magnets 154 or are coupled to the plurality of magnets 154. As an illustration, a particular tooling pin 156 has a hollow bottom surface, and a particular magnet of the plurality of magnets 154 is inserted into the hollow bottom surface. As another illustration, a particular magnet of the plurality of magnets 154 has a top or crown which forms the tooling pin 156.

The tooling pins 156 are configured to provide a retaining force to resist movement of the ply charge 114. For example, the retaining force of the tooling pin 156 resists movement of the ply charge 114 away from a layup position (e.g., a desired or operational position of the ply charge 114 on the layup surface 142). The retaining force is generated based on the magnetic interaction and magnetic coupling between the magnets 134, 154.

The tooling pins 156 are inserted into corresponding tooling holes 152 of the ply charge 114. In some implementations, one or more tooling holes 152 of the tooling holes 152 are located in a manufacturing excess area of the ply charge 114. In a particular implementation, the manufacturing excess area is removed during a trimming operation performed after the resin 126 is cured. Additionally or alternatively, one or more tooling holes 152 of the tooling holes 152 are located in an active portion of the ply charge 114 (e.g., a portion of the ply charge 114 that is used in the composite part 602) and the one or more tooling holes 152 are filled in during trimming, used for indexing, trimming installation (e.g., a bolt hole), etc. In some implementations, the tooling pins 156 extend through tooling holes 152. The tooling pins 156 do not pierce the first vacuum bag 116 or the second vacuum bag 118 during curing of the ply charge 114 and the resin 126. For example, a length of the tooling pins 156 can be selected based on a height of the layup stack to limit force applied to the second vacuum bag 118 when the layup stack is compressed by the vacuum device(s) 122.

Figure 4:
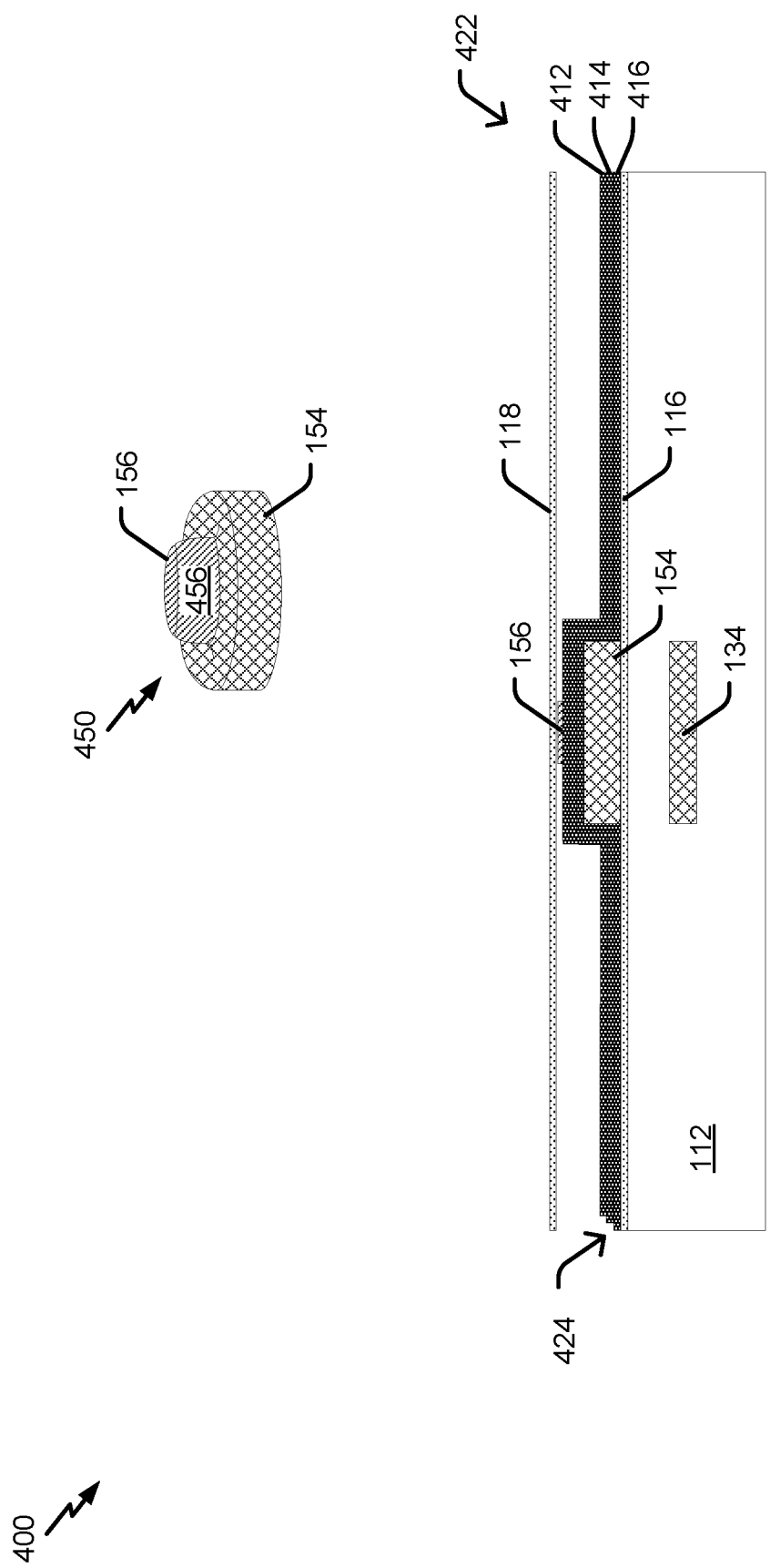
FIG. 4 is another diagram that illustrates an expanded cross-section view of a tool and a ply charge of the composite part manufacturing system of FIG. 1.

In some implementations, each magnet 154 of the magnets 154 includes a corresponding crown, such as a crown 456 of FIG. 4, and the crown includes or corresponds to the tooling pin 156. The crown, tooling pin 156, or both, include metals (e.g., steel), hardened plastics, or other materials with low thermal expansion and high heat resistance (e.g., Teflon, a registered trademark of the DuPont Company). In some implementations, the plurality of magnets 154 include tooling pins 156 with multiple materials. For example, a first particular magnet 154 of the plurality of magnets 154 includes a first tooling pin 156 having a first material, and a second particular magnet 154 of the plurality of magnets 154 includes a second tooling pin 156 having a second material, and the first material has a first thermal expansion coefficient that is greater than a second thermal expansion coefficient of the second material. In this example, tooling pins 156 with lower thermal expansion coefficients can be used in areas of the ply charge 114 that experience higher temperatures and/or higher levels of deformation as compared to other areas of the ply charge 114.

During use to form a composite part, the first vacuum bag 116 is coupled to the tool 112 and positioned between the tool 112 and the ply charge 114. For example, the first vacuum bag 116 is placed onto the layup surface 142 of the tool 112. In some implementations, the first vacuum bag 116 is placed over one or more cavities of the tool 112.

The second vacuum bag 118 is coupled to the tool 112 and positioned on the ply charge 114 and the first vacuum bag 116. For example, the second vacuum bag 118 is placed over the ply charge 114 and the first vacuum bag 116 and fully overlays the ply charge 114 and the first vacuum bag 116. Additionally, coupling the vacuum bags 116, 118 to the tool 112 may form or define one or more cavities, as described further with reference to FIG. 2.

In some implementations, the vacuum bags 116, 118 include a thermoplastic elastomer or nylon film material. The vacuum bags 116, 118 are configured to deform responsive to force and/or heat. For example, the vacuum bags 116, 118 undergo plastic deformation responsive to vacuum pressure, heat, or both. As an illustrative, non-limiting example, the vacuum bags 116, 118 are capable of approximately an 500 percent elongation in one or more directions.

The curing device 120 is configured to provide energy to cure the resin 126 to form the composite part 602. The curing device 120 can apply the energy as heat, light (e.g., ultraviolet (UV) light), or both. For example, the curing device 120 can include or correspond to a heater, a laser, an oven, an autoclave, or another heating device. As another example, the curing device 120 can include a UV light source or another lighting device. In some implementations, the curing device 120 includes both a lighting device and a heating device, or the composite part manufacturing system 102 includes more than one curing device 120, including a lighting device and a heating device.

The one or more vacuum devices 122 includes one or more components configured to generate and maintain vacuum conditions (e.g., vacuum pressure, which is a pressure less than an ambient pressure, or a vacuum seal). For example, the one or more vacuum devices 122 can include pumps, tubing, piping, vacuum plates, a bladders, etc., configured to generate and maintain vacuum conditions in cavities of the composite part manufacturing system 102. For example, the one or more vacuum devices 122 can generate independent vacuum conditions in distinct cavities of the composite part manufacturing system 102, as illustrated in FIG. 2. The cavities may include ply charge cavities formed by (e.g., between) the vacuum bags 116, 118, layup (e.g., tooling) cavities formed between the tool 112 (e.g., defined by the plurality of surfaces 132) and one or more the vacuum bags 116, 118, or a combination thereof. The one or more vacuum devices 122 generate and maintain the vacuum conditions during at least a portion of the fabrication process of the composite part 602.

In the example illustrated in FIG. 1, the composite part manufacturing system 102 includes a resin infuser 124. The resin infuser 124 includes or corresponds to a resin tank (and other components) configured to store the resin 126 and to enable delivery of the resin 126 to the ply charge 114. For example, the resin infuser 124 can infuse the ply charge 114 with the resin 126 via resin distribution components based on vacuum pressure generated by the one or more vacuum devices 122, as described with reference to FIG. 2. To illustrate, a door or valve of the resin tank of the resin infuser 124 is opened after a desired vacuum pressure or vacuum state is achieved in the ply cavity. Alternatively, or in addition, the resin infuser 124 can include a pump to pump the resin 126 to the ply charge 114.

In some implementations, the composite part manufacturing system 102 further includes one or more consumables 128 to facilitate forming the composite part 602. As illustrative, non-limiting examples, the one or more consumables 128 can include a release film, a breather fabric, one or more resin distribution components, or a combination thereof. In some implementations, the one or more consumables 128 are applied or affixed to the ply charge 114. In such implementations, a retaining force of the tooling pin 156 resists movement of the ply charge 114 during application of the one or more consumables to the ply charge 114.

In some implementations, the composite part manufacturing system 102 further includes a controller 130. In such implementations, the controller 130 includes a processor and a memory. The memory stores computer-executable instructions (e.g., a program of one or more instructions). The processor is configured to execute the computer-executable instructions stored in the memory. The instructions, when executed, cause one or more components of the composite manufacturing system to perform one or more operations of the methods described with reference to FIGS. 7-9.

For example, the controller 130 can be configured to control one or more components of the composite part manufacturing system 102. For example, the controller 130 may control or coordinate operation of the layup device 160, the curing device 120, the one or more vacuum devices 122, the resin infuser 124, or a combination thereof. To illustrate, the controller 130 generates and transmits one or more commands to the one or more components of the composite part manufacturing system 102.

Prior to operation of the composite part manufacturing system 102, the tool 112 is fabricated, assembled, or otherwise manufactured. For example, the plurality of magnets 134 are embedded in the tool 112 beneath or flush with the layup surface 142 thereof. In such implementations, the magnets 134 can be partially embedded or fully embedded within the tool 112. As another example, the tool 112 is formed and the plurality of magnets 134 are coupled (e.g., removably coupled) to the opposing surface 144, such as a backside of the tool 112. Removably coupling the plurality of magnets 134 to the opposing surface 144 enables the plurality of magnets 134 to be moved to accommodate deformation (e.g., warping) of the tool 112 or degradation of the plurality of magnets 134.

During operation of the composite part manufacturing system 102, a user or the layup device 160 couples the ply charge 114 to the tool 112 using the plurality of magnets 154 to align with the magnets 134 of the tool 112 to position (e.g., center) the ply charge 114 in a layup position. The resin infuser 124 applies the resin 126 to the ply charge 114 to generate a resin-infused ply charge 114 (e.g., a composite material), the one or more vacuum devices 122 generate and maintain vacuum conditions (e.g., vacuum pressure or vacuum seal), and the curing device 120 applies energy to cure the composite material (the ply charge 114 and the resin 126) responsive to receiving commands from the controller 130. In some implementations, one or more of the layup device 160, the resin infuser 124, the vacuum device(s) 122, the curing device 120, operates responsive to a signal or command from the controller 130. At least a portion of composite material (e.g., the resin 126) undergoes chemical reactions and the composite material deforms to form the composite part 602 during curing. The composite part 602, after curing, has a contoured surface that matches a contoured surface (e.g., the layup surface 142) of the tool 112.

In some implementations, the layup device 160 applies or deposits the ply charge 114, the resin 126, or both, onto a worksurface separate from the layup surface 142 to form a layup stack. In such implementations, the layup stack is subsequently moved to the tool 112 to form the composite part 602.

In some implementations, the composite part manufacturing system 102 generates a working part (as opposed to a final composite part). The working part is then post processed, often referred to as "trimmed" (e.g., cut, machined, polished, filled, bent, etc.) into the composite part 602.

In some implementations, the tool 112 is manufactured from a metallic material (e.g., aluminum, steel, or Invar), from a composite thermoset material (e.g. bismaleimide (BMI) carbon fiber epoxy), from a carbon reinforced thermoplastic, from another a thermoplastic polymer material (e.g., Acrylonitrile-Butadiene-Styrene (ABS) material or carbon filled ABS material), a thermoset polymer material, or another polymer material. The tool 112 may be built-up using an additive manufacturing process, such as fused filament fabrication, fused deposition modeling, plastic jet printing, 3-D printing, powder bed processing, selective heat sintering, stereolithography, selective laser melting, selective laser sintering, and the like.

Figure 3:
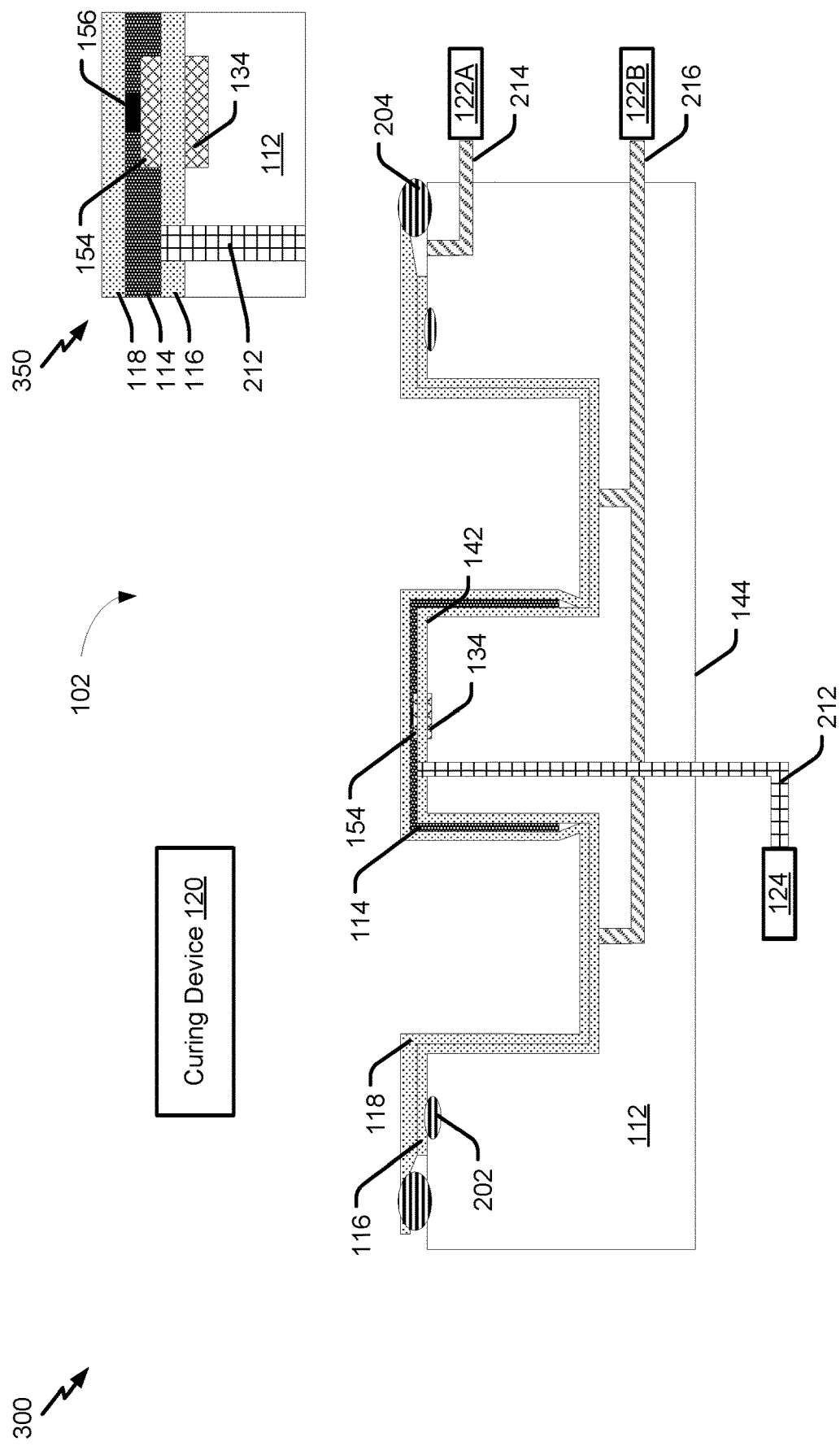
FIG. 3 is a diagram that illustrates a cross-section view of the example of the composite part manufacturing system of FIG. 2 after curing.

FIGS. 2 and 3 are diagrams that illustrate cross-section views of an example of the composite part manufacturing system 102 of FIG. 1. The diagram 200 of FIG. 2 illustrates an example of the composite part manufacturing system 102 after layup has been completed to form a layup stack 220 and prior to deformation of the ply charge 114.

As illustrated in FIG. 2, the composite part manufacturing system 102 includes the tool 112, the ply charge 114, the vacuum bags 116, 118, the curing device 120, the one or more vacuum devices 122A, 122B, and the resin infuser 124 of FIG. 1. The tool 112 includes the magnets 134, the layup surface 142, and the opposing surface 144. The layup stack 220 includes the ply charge 114 with the magnets 154 and the tooling pin 156 in the tooling hole 152. Although not shown in FIG. 2, the layup stack 220 can also include the one or more consumables 128 of FIG. 1.

As explained above, in some implementations, the layup stack 220 can also include the resin 126 (e.g., in a pre-preg material), in which case the composite part manufacturing system 102 can omit the resin infuser 124. However, in the example illustrated in FIG. 2, the composite part manufacturing system 102 includes the resin infuser 124 and resin distribution components 212 (e.g., tubing or piping).

In FIG. 2, the first vacuum bag 116 is coupled to first attachment areas 202 of the tool 112, and the second vacuum bag 118 is coupled to second attachment areas 204 of the tool 112. The tool 112, the first vacuum bag 116, and the second vacuum bag 118 define a ply cavity 206, and the tool 112 and the first vacuum bag 116 define layup cavities 208A, 208B. The vacuum bags 116, 118 are coupled to the attachment areas 202, 204 via adhesives (e.g., tape).

As illustrated in the example of FIG. 2, the one or more vacuum devices 122A, 122B are coupled to (e.g., in flow communication with) the cavities 206, 208A, and 208B. For example, the first vacuum device 122A is coupled to the ply cavity 206 via a channel 214, and the second vacuum device 122B is coupled to the layup cavities 208A, 208B via a channel 216. The channels 214, 216 can includes piping, conduit, or a bore hole in the tool 112. The one or more vacuum devices 122A, 122B are configured to generate vacuum pressure and to evacuate the cavities 206, 208A, 208B using the channels 214, 216.

Referring to the diagram 300 of FIG. 3, the composite part manufacturing system 102 is illustrated after the ply charge 114 has been deformed and cured (e.g., composite part has been formed). For example, heat and/or light from the curing device 120 and vacuum pressure generated by the one or more vacuum devices 122A, 122B cause the ply charge 114 and the vacuum bags 116, 118 to deform. As illustrated in FIG. 3, the ply charge 114 and the vacuum bags 116, 118 have deformed to eliminate the layup cavities 208A, 208B of FIG. 2. In other implementations, the ply charge 114, the vacuum bags 116, 118, or a combination thereof, deform to a lesser extent than illustrated in FIG. 3. Additionally, the tool 112 may have other geometries and/or layup supports to guide deformation of the ply charge 114, the vacuum bags 116, 118, or a combination thereof.

Diagram 300 of FIG. 3 further includes an expanded illustration 350 of the magnets 134, 154. As illustrated in the expanded illustration 350, the magnet 154 and the tooling pin 156 have not pierced the second vacuum bag 118 during deformation, and the magnets 134, 154 are still aligned after deformation.

FIG. 4 is a diagram 400 that illustrates another example of a cross-section of an expanded view of the magnets 134, 154 of the tool 112 and the ply charge 114. As illustrated in FIG. 4, the ply charge 114 includes multiple layers 412-416 of carbon fiber. Edges of the multiple layers 412-416 can be straight (as illustrated by a first edge 422) or can be tapered (as illustrated by a second edge 424). As illustrated in the example of FIG. 4, the tooling pin 156 extends flush with or past a top surface of the ply charge 114. A top surface of the tooling pin 156 protrudes from the tooling hole 152. In other implementations, the tooling pin 156 does not extend past the top surface of the ply charge 114.

Diagram 400 of FIG. 4 further includes an expanded illustration 450 of one of the magnets 154 and the tooling pin 156. As illustrated in the expanded illustration 450, the tooling pin 156 corresponds to a crown 456 of the magnet 154. The tooling pin 156 and the crown 456 have a circular cross-section and are substantially (e.g., within manufacturing tolerances) cylindrical. In other implementations, the tooling pin 156 and/or the crown 456 have a triangular cross-section, rectangular cross-section, elliptical cross-section, etc.

Figure 5:
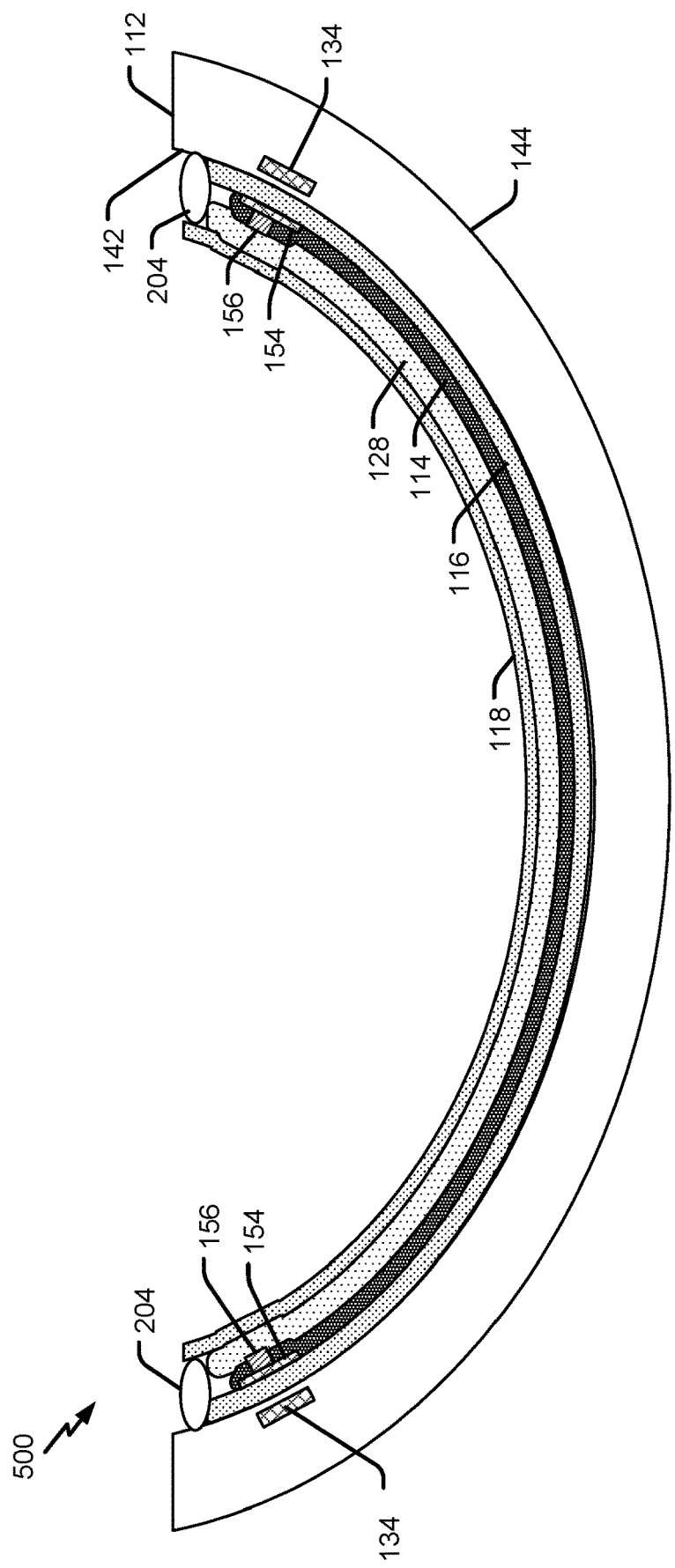
FIG. 5 is a diagram that illustrates a cross-section view of another example of a tool of the composite part manufacturing system of FIG. 1.

FIG. 5 is a diagram 500 that illustrates another example of a tool 112 of the composite part manufacturing system 102 of FIG. 1. As illustrated in FIG. 5, the diagram 500 illustrates a cross-section view of the tool 112 having a curved layup surface 142. The tool 112 includes a plurality of magnets 134 embedded within the tool 112. In other implementations, the plurality of magnets 134 are partially embedded in the tool 112, coupled to the opposing surface 144, or both.

Highly curved tools, such as the tool 112 of FIG. 5, pose a greater difficulty to position, index, and locate a ply charge, such as the ply charge 114 of FIG. 1, than flat or lightly curved tools. Additionally, vertical surfaces of tools pose a greater difficulty than horizontal surfaces of tools. The plurality of magnets 134 enable a layup stack, including the ply charge 114, the plurality of magnets 154, the tooling pins 156, and possibly other components (such as the vacuum bags 116, 118, the consumables 128, etc.) to be assembled or laid up flat on a horizontal surface and then brought to the tool 112, draped to a contour of the layup surface 142 of the tool 112, and indexed to a layup position for curing via interaction of the magnets 134 and the magnets 154. While in position, the tooling pins 156 retain the ply charge 114 in position by preventing slippage down the vertical side walls of the layup surface 142.

Figure 6:
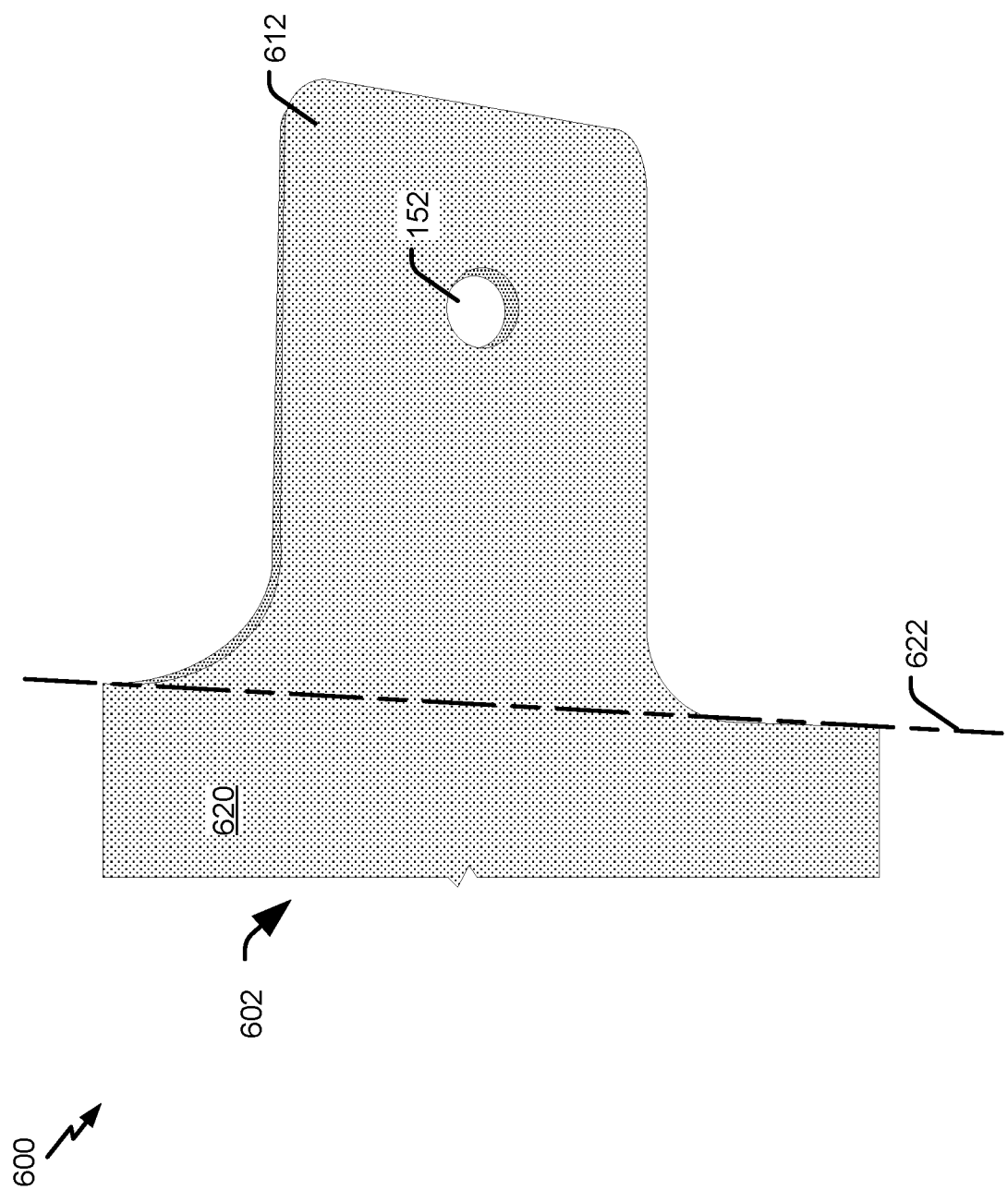
FIG. 6 is a diagram that illustrates a perspective view of an example of a tooling hole and a manufacturing excess area of a composite part formed by the composite part manufacturing system of FIG. 1.

FIG. 6 is a diagram 600 that illustrates an example of a composite part 602 formed by the composite part manufacturing system 102 of FIG. 1. As illustrated in FIG. 6, the diagram 600 illustrates a perspective view of the composite part 602. The composite part 602 includes or is formed of a cured composite material 620 including the ply charge 114 and cured resin 126. The composite part 602 includes a tooling hole 152 that is formed during curing or formation of the composite part 602. In the example illustrated in FIG. 6, the tooling hole 152 is located in a manufacturing excess area 612 of the composite part 602 that is to be removed during trimming. A trim line 622 illustrates boundaries of the manufacturing excess area 612. By positioning tooling holes 152 in a manufacturing excess area 612 of a composite part 602, trimming (e.g., filling or other post-processing) of the composite part 602 is reduced. In other examples, the tooling hole 152 can also or in the alternative be used in assembly of an apparatus or system using the composite part 602 or to index the composite part 602. When the tooling hole 152 is used during assembly of the composite part 602 (e.g., as a through hole of a fastener), the tooling pin 156 used to form the tooling hole 152 can be sized based at least in part on a size of a fastener to be used during the assembly process, which can reduce a number of operations required to during assembly (e.g., by eliminating or simplifying a drilling or burr removal process).

Figure 7:
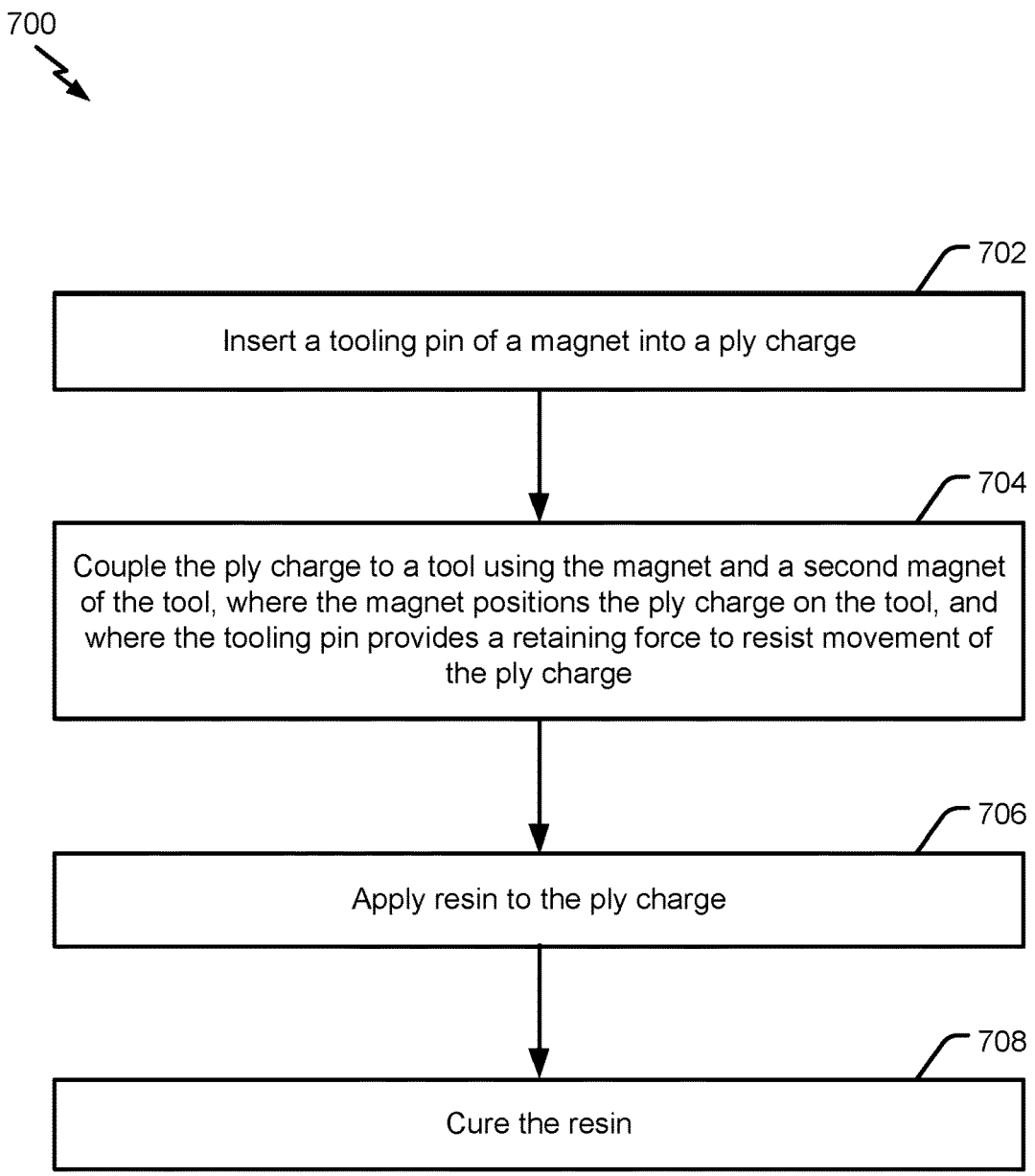
FIG. 7 is a flow chart of an example of a method of composite part manufacturing.

FIG. 7 illustrates a particular example of a method 700 of composite part manufacturing, such as forming the composite part 602 of FIG. 6. The method 700 may be performed by the composite part manufacturing system 102 and components thereof, such as the layup device 160 and the curing device 120 of FIG. 1, as illustrative, non-limiting examples.

The method 700 includes, at 702, inserting a tooling pin of a magnet into a ply charge. For example, the tooling pin may include or correspond to the tooling pin 156 of FIG. 1, and the magnet may include or correspond to one of the magnets 154 of FIG. 1. To illustrate, the tooling pin 156 and magnet 154 are inserted into the tooling hole 152 of the ply charge 114, as described with reference to FIG. 1.

The method 700 also includes, at 704, coupling the ply charge to a tool using the magnet and a second magnet of the tool. The magnet positions the ply charge on the tool, and the tooling pin provides a retaining force to resist movement of the ply charge. For example, the tool can include or correspond to the tool 112 of FIG. 1, and the second magnet can include or correspond to one of the magnets 134 of FIG. 1. To illustrate, the ply charge 114 is positioned and retained on the layup surface 142 of the tool 112 via magnetic interaction between the plurality of magnets 154 and the plurality of magnets 134 which can interact through the first vacuum bag 116.

The method 700 includes, at 706, applying resin to the ply charge. For example, the resin includes or corresponds to the resin 126 of FIG. 1. To illustrate, the resin infuser 124 can apply the resin 126 to the ply charge 114 via the resin distribution components 212 to generate a resin infused ply charge 114 (e.g., composite materials), as described with reference to FIGS. 1 and 2. In some implementations, ply charge can include resin (e.g., the ply charge can include a pre-preg material). In such implementations, applying resin to the ply charge, at 706, can be omitted.

The method 700 further includes, at 708, curing the resin. For example, energy (e.g., light and or heat) are applied to the resin 126 (and to the ply charge 114) to cure the resin 126 to generate a cured composite material. To illustrate, the one or more vacuum devices 122 generate vacuum pressure and the curing device 120 directs energy toward the resin 126. Together, the vacuum pressure and energy causes the ply charge 114 to deform and the resin 126 to cure. The cured composite material can be trimmed to generate a composite part, such as the composite part 602 of FIG. 6.

The layup surface 142 is configured to support formation of a composite part 602 and has a shape that is complementary to a shape of the composite part 602. In some implementations, applying the ply charge 114 onto the layup surface 142 includes depositing or placing the ply charge 114 manually or by an automated device. For example, the ply charge 114 can be deposited or placed by the layup device 160 (which is controlled by the controller 130) to form the composite part 602, as described with reference to FIG. 1.

As another example, the layup device 160 applies the ply charge 114 onto the layup surface 142 of the tool 112 responsive to receiving commands from the controller 130, as described with reference to FIG. 1. For example, the ply charge 114 can be applied to the layup surface 142 by robotic placement (e.g., a pick-and-place arm), Automated Fiber Placement (AFP), Automated Tap Laying (ATL), or any combination thereof.

Figure 8:
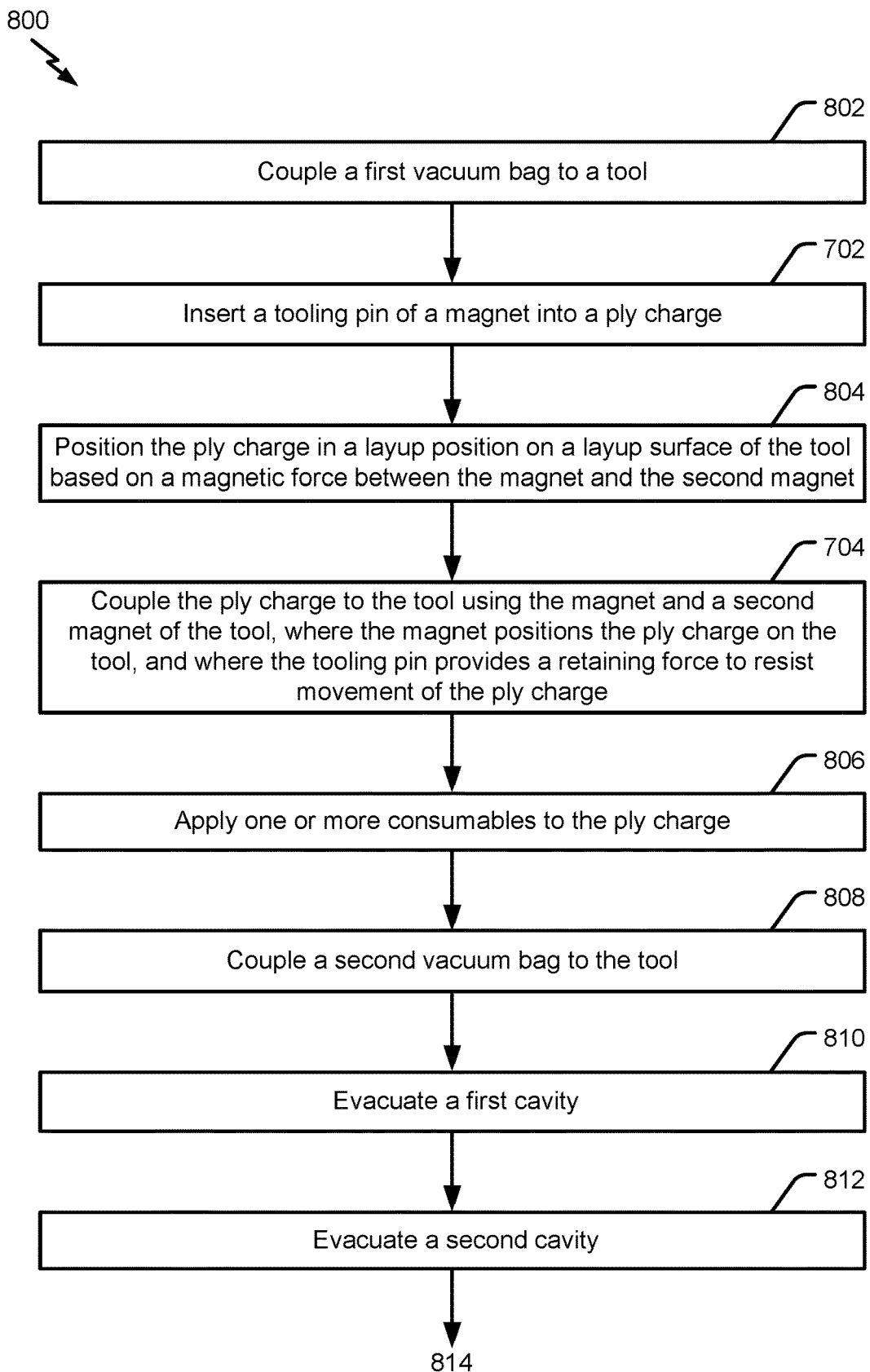
FIG. 8 is a first part of a flow chart of another example of a method of composite part manufacturing.
Figure 9:
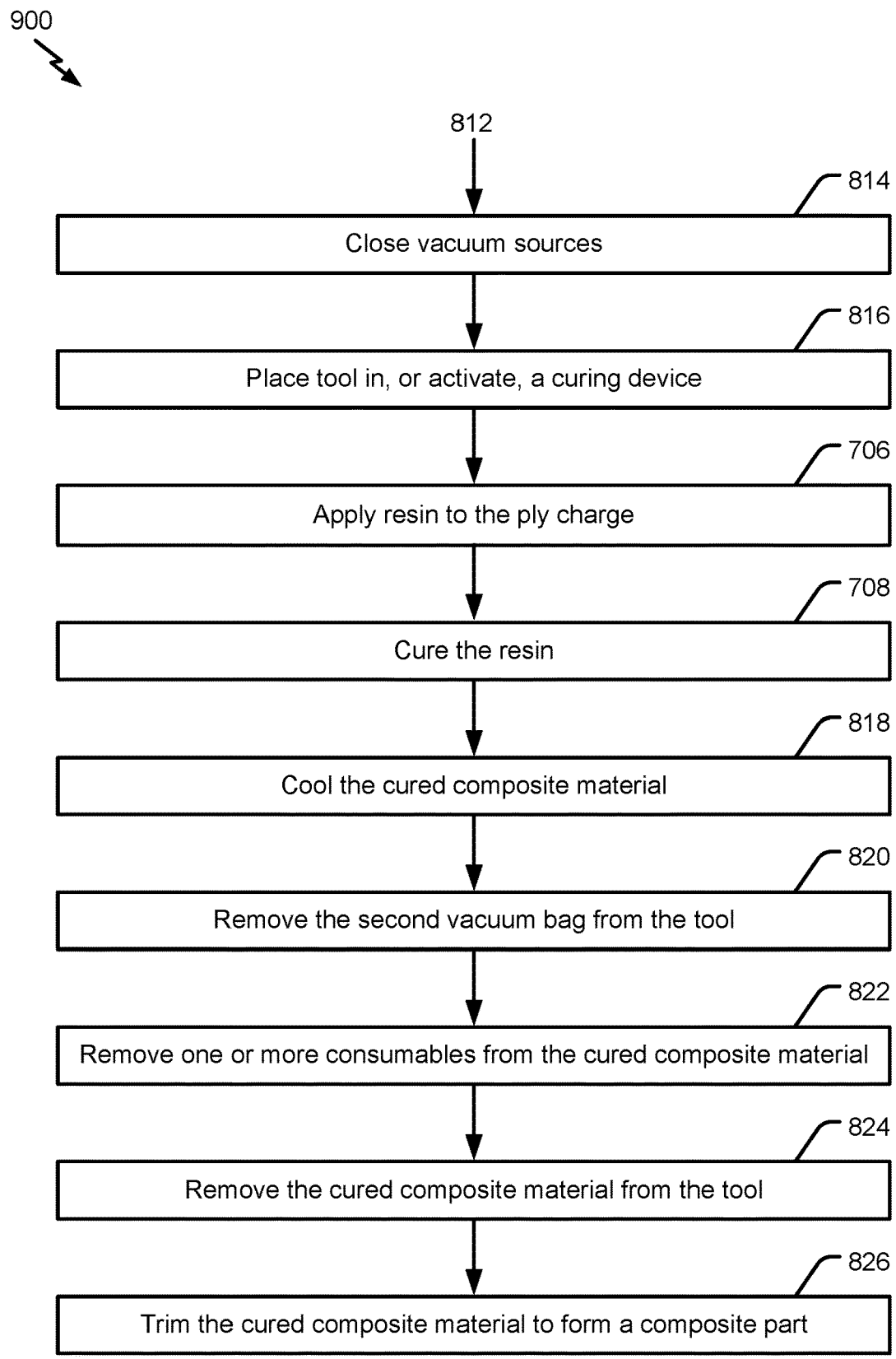
FIG. 9 is a second part of the flow chart of FIG. 8.

FIGS. 8 and 9 together illustrate another example of a method 800 of composite part manufacturing. The method 800 may be performed by the composite part manufacturing system 102, the layup device 160, the curing device 120 of FIG. 1, or a combination thereof, as illustrative, non-limiting examples.

The method 800 includes, at 802, coupling a first vacuum bag to a tool. For example, the first vacuum bag 116 is placed or positioned over the layup surface 142 and is coupled to the first attachment areas 202 of the tool 112, as described with reference to FIGS. 1 and 2. To illustrate, the first vacuum bag 116 is placed over or on top of the tool 112. The first vacuum bag 116 overlays the layup surface 142 to define the layup cavities 208A, 208B.

The method 800 includes, at 702, inserting a tooling pin of a magnet into a ply charge, as described with reference to FIG. 7. The method 800 includes, at 804, positioning the ply charge in a layup position relative to the layup surface of the tool based on a magnetic force between the magnet and the second magnet. To illustrate, the ply charge 114 can be laid up on the layup surface 142 of the tool 112 by hand or by the layup device 160. Each of the plurality of magnets 134 is magnetically attracted to a corresponding magnet of the plurality of magnets 154 of the tool 112 through the first vacuum bag 116. The magnetic coupling force between the magnets 134, 154 positions or moves the ply charge 114 in the layup position.

The method 800 includes, at 704, coupling the ply charge to the tool using the magnet and a second magnet of the tool, as described with reference to FIG. 7. The magnet retains the ply charge on the tool to resist movement of the ply charge. The magnets 134, 154 may be coupled by hand or by machinery.

The method 800 includes, at 806, applying one or more consumables to the ply charge. For example, the one or more consumables can include or correspond to the one or more consumables 128 of FIG. 1, the resin distribution components of FIG. 2, or both. To illustrate, breather fabrics, release liners, and/or the resin distribution components 212 are applied to the ply charge 114 and the tool 112, as described with reference to FIGS. 1 and 2.

The method 800 includes, at 808, coupling a second vacuum bag to the ply charge. For example, the second vacuum bag 118 is placed or positioned over the layup surface 142 and is coupled to the second attachment areas 204 of the tool 112, as described with reference to FIGS. 1 and 2. To illustrate, the second vacuum bag 118 is placed over or on top of the one or more consumables 128, the ply charge 114, the first vacuum bag 116, and a portion of the tool 112. The second vacuum bag 118 overlays the one or more consumables 128, the ply charge 114, and the first vacuum bag 116 to define the ply cavity 206.

The method 800 includes, at 810, evacuating a first cavity. For example, the first cavity may include or correspond to the ply cavity 206 of FIG. 2. To illustrate, the first vacuum device 122A generates vacuum pressure and applies the vacuum pressure to the ply cavity 206 via the channel 214 to evacuate the ply cavity 206.

The method 800 includes, at 812, evacuating a second cavity. For example, the second cavity may include or correspond to one or more of the layup cavities 208A, 208B of FIG. 2. To illustrate, the second vacuum device 122B generates vacuum pressure and applies the vacuum pressure to the layup cavities 208A, 208B via the channel 216 to evacuate the layup cavities 208A, 208B. In other implementations, the second cavity can be evacuated prior to the first cavity being evacuated. Alternatively, the first cavity and the second cavity can be evacuated concurrently with one another.

The method 800 includes, at 814, closing vacuum sources. For example, the one or more vacuum devices 122 are separated from, e.g., are no longer in fluid communication with, the cavities 206, 208A, 208B of FIG. 2. To illustrate, valves of the one or more vacuum devices 122A, 122B, the channels 214, 216, or a combination thereof, are closed. Closing the one or more vacuum sources seals and maintains a vacuum pressure or vacuum state within the cavities 206, 208A, 208B of FIG. 2.

The method 800 includes, at 816, placing the tool in, or activating, a curing device. For example, the curing device 120 can include or correspond to an oven or autoclave, and the tool 112, with the ply charge 114 attached, can be placed into and heated by the oven or autoclave. The curing device 120 applies energy (e.g., heat, light, or both) to the ply charge 114 responsive to receiving an activation signal from the controller 130.

The method 800 includes, at 706, applying resin to the ply charge, as described with reference to FIG. 7. Operations 816 and 706 can be performed in any order or can be performed contemporaneously. Further, as described with reference to FIG. 7, if the ply charge already include resin, applying the resin, at 706, can be omitted. The method 800 includes, at 708, curing the resin, as described with reference to FIG. 7, to form a cured composite material.

The method 800 includes, at 818, cooling the cured composite material. For example, the tool 112, with the ply charge 114 attached, can be removed from an oven or autoclave or the controller 130 can send a deactivation signal to the curing device 120. The cured composite material cools toward ambient temperature in the absence of applied heat.

The method 800 includes, at 820, removing the second vacuum bag from the tool. For example, the second vacuum bag 118 is removed from tool 112 by a machine or by hand. The method 800 includes, at 822, removing the one or more consumables from the cured composite material. For example, the one or more consumables 128 are removed from the cured composite material and the tool 112 by a machine or by hand. To illustrate, breather fabrics, release liners, and the resin distribution components of FIG. 2 are removed (e.g., using a machine or by hand). The method 800 includes, at 824, removing the cured composite material from the tool. For example, the cured composite material is removed from tool 112 by a machine or by hand.

The method 800 includes, at 826, trimming the cured composite material to form a composite part. For example, the composite part may include or correspond to the composite part 602 of FIG. 6. To illustrate, the composite part 602 may be trimmed by hand, machine, or both. Trimming operations include cutting, machining, polishing, filling, bending, etc. In a particular implementation, the composite part 602 includes a tooling hole 152 in a manufacturing excess area 612 that is removed during trimming.

In some implementations, the tool 112 of the method 700 or 800 is an additively manufactured tool assembly, e.g., one or more pieces thereof are made by an additive manufacturing process, such as fused filament fabrication, fused deposition modeling, plastic jet printing, 3-D printing, powder bed processing, selective heat sintering, selective laser sintering, stereolithography, selective laser melting, and the like.

The method 700 of FIG. 7 and/or the method 800 of FIGS. 8 and 9 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 700 of FIG. 7 and/or the method 800 of FIGS. 8 and 9 can be initiated or controlled by one or more processors, such as one or more processors included in or coupled to the controller 130 of the composite part manufacturing system 102. In some implementations, one or more operations of one of the methods of FIG. 7 or FIGS. 8 and 9 may be combined with one or more operations of the other of the methods of FIG. 7 or FIGS. 8 and 9. Additionally, one or more operations described with reference to the methods of FIG. 7 or FIGS. 8 and 9 may be optional, may be performed in a different order than shown or described, or both. Additionally, two or more operations described with reference to the methods of FIG. 7 or FIGS. 8 and 9 may be performed at least partially concurrently.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of composite part manufacturing, the method comprising:
   inserting a tooling pin of a magnet of a plurality of magnets into a ply charge, wherein each magnet of the plurality of magnets comprises a corresponding tooling pin, wherein the ply charge includes a plurality of tooling holes, wherein tooling pins of the plurality of magnets are positioned in the plurality of tooling holes and extend through the plurality of tooling holes;
   magnetically coupling the ply charge to a tool using the plurality of magnets and a second magnet of a second plurality of magnets of the tool, wherein the magnet positions the ply charge relative to a layup surface of the tool, and wherein the tooling pin provides a retaining force to resist movement of the ply charge;
   applying resin to the ply charge; and curing the resin to form a cured composite material via a curing device providing energy to the resin.

2. The method of claim 1, further comprising:
prior to coupling the ply charge to the tool, coupling a first vacuum bag to the tool; and
after coupling the ply charge to the tool, coupling a second vacuum bag to the tool, wherein the second vacuum bag is placed over the ply charge and the first vacuum bag.

3. The method of claim 2, further comprising evacuating a first cavity, the first cavity defined by the first vacuum bag, the second vacuum bag, and the tool.

4. The method of claim 3, further comprising, after evacuating the first cavity, evacuating a second cavity, the second cavity defined by the first vacuum bag and the tool.

5. The method of claim 1, further comprising, after coupling the ply charge to the tool, applying one or more consumables to the ply charge, wherein the retaining force of the tooling pin resists movement of the ply charge during application of the one or more consumables to the ply charge, and wherein the one or more consumables include a release film, a breather fabric, one or more resin distribution components, or a combination thereof.

6. The method of claim 1, further comprising, prior to coupling the ply charge to the tool, positioning the ply charge in a layup position on the layup surface of the tool based on a magnetic force between the magnet and the second magnet, wherein the retaining force of the tooling pin resists movement of the ply charge away from the layup position.

7. The method of claim 6, wherein the magnetic force couples the ply charge to the tool, and wherein the second magnet is embedded in the tool and is located below the layup surface of the tool.

8. The method of claim 1, wherein curing the resin includes placing the tool and the ply charge in an oven or autoclave.

9. The method of claim 8, further comprising:
cooling the cured composite material;
removing a second vacuum bag from the tool;
removing one or more consumables from the cured composite material; and
removing the cured composite material from the tool.

10. The method of claim 1, further comprising, after curing the resin, trimming the cured composite material to form a composite part.

11. The method of claim 1, wherein the tooling pin is inserted into a tooling hole of the plurality of tooling holes, wherein the tooling hole is located in a manufacturing excess area of the ply charge, and wherein the manufacturing excess area is removed during trimming of the cured composite material.

12. A system comprising:
a tool including a layup surface and a first plurality of magnets;
a ply charge;
a second plurality of magnets, the second plurality of magnets configured to magnetically couple with the first plurality of magnets of the tool to position the ply charge relative to the layup surface, wherein each second magnet of the second plurality of magnets comprises a corresponding tooling pin, wherein the ply charge includes a plurality of tooling holes, wherein tooling pins of the second plurality of magnets are positioned in the plurality of tooling holes and extend through the plurality of tooling holes; and
a curing device configured to provide energy to cure a resin applied to the ply charge.

13. The system of claim 12, further comprising:
a first vacuum bag coupled to the tool and positioned between the tool and the ply charge;
a second vacuum bag coupled to the tool and positioned on the ply charge and the first vacuum bag; and
one or more vacuum devices configured to evacuate cavities formed by the first vacuum bag and the second vacuum bag.

14. The system of claim 12, wherein each second magnet of the second plurality of magnets includes a corresponding crown.

15. The system of claim 13, wherein the tooling pins do not pierce the first vacuum bag and do not pierce the second vacuum bag.

16. The system of claim 13, wherein the ply charge includes multiple layers of dry carbon fiber, wherein the first vacuum bag comprises a thermoplastic elastomer or nylon film material, and wherein the curing device comprises an autoclave.

17. The system of claim 12, wherein the tool comprises a plurality of surfaces defining one or more cavities, the plurality of surfaces having a first attachment area for a first vacuum bag and a second attachment area for a second vacuum bag, the plurality of surfaces including the layup surface, the layup surface configured to support a ply charge, wherein the first plurality of magnets is coupled to the layup surface.

18. The system of claim 17, wherein the first plurality of magnets comprise neodymium magnets.

19. The system of claim 17, wherein the first plurality of magnets include cylindrical magnets, and wherein the first plurality of magnets are embedded in the tool.

20. The system of claim 17, further comprising an opposing surface opposite the layup surface, wherein the first plurality of magnets are coupled to the opposing surface.

* * * * *